(12) United States Patent
Schroeder

(10) Patent No.: US 12,102,025 B2
(45) Date of Patent: Oct. 1, 2024

(54) SYSTEM AND METHOD FOR CONTROLLING THE OPERATION OF AN AGRICULTURAL IMPLEMENT

(71) Applicant: CNH Industrial America LLC, New Holland, PA (US)

(72) Inventor: Brittany Schroeder, Bunker Hill, IN (US)

(*) Notice: Subject to any disclaimer, the term of this patent is extended or adjusted under 35 U.S.C. 154(b) by 239 days.

(21) Appl. No.: 17/939,458

(22) Filed: Sep. 7, 2022

(65) Prior Publication Data

US 2024/0074343 A1 Mar. 7, 2024

(51) Int. Cl.
*A01B 79/00* (2006.01)
*A01B 33/02* (2006.01)
*A01B 63/111* (2006.01)

(52) U.S. Cl.
CPC ........ *A01B 79/005* (2013.01); *A01B 63/1112* (2013.01); *A01B 33/024* (2013.01)

(58) Field of Classification Search
CPC . A01B 79/005; A01B 63/1112; A01B 33/024; A01B 47/027
See application file for complete search history.

(56) References Cited

U.S. PATENT DOCUMENTS

| | | | |
|---|---|---|---|
| 8,576,056 B2 | 11/2013 | Clair et al. | |
| 9,554,098 B2 | 1/2017 | Casper et al. | |
| 9,600,872 B2 | 3/2017 | Dima | |
| 10,524,409 B2 | 1/2020 | Posselius et al. | |
| 10,687,476 B2 | 6/2020 | Gowa | |

(Continued)

FOREIGN PATENT DOCUMENTS

| | | | |
|---|---|---|---|
| CN | 109937685 A | 6/2019 | |
| CN | 112237087 A | 1/2021 | |

(Continued)

OTHER PUBLICATIONS

Screen Captures from YouTube Video Clip "Lavori conto terzi vigna in Sardegna. Impresa Agricola Piga Franco Villaputzu" Uploaded on Mar. 10, 2014, by user "Cavalliecavalli macchine agricole in Sardegna" (7 pages) Retrieved from Internet: https://www.youtube.com/watch?v=Bllki_rD534&t=0s.

(Continued)

*Primary Examiner* — Thomas Ingram
(74) *Attorney, Agent, or Firm* — Rebecca L. Henkel; Peter K. Zacharias; Rickard K. DeMille

(57) ABSTRACT

An agricultural implement includes a computing system configured to identify a plurality of residue pieces present within the portion of the field based on the image data generated by the imaging device. Furthermore, the computing system is configured to determine a number of residue pieces having a length within a first length range and a number of residue pieces having a length within a second length range. Moreover, the computing system is configured to determine a characteristic length range for the portion of the field, with the characteristic length range corresponding to one of the first length range or the second length range having the greatest number of residue pieces associated therewith. In addition, the computing system is configured to control an operating parameter of the ground-engaging tool based on the determined characteristic length range.

20 Claims, 6 Drawing Sheets

(56) References Cited

U.S. PATENT DOCUMENTS

| | | | |
|---|---|---|---|
| 10,721,859 | B2 | 7/2020 | Wu et al. |
| 10,813,265 | B2 | 10/2020 | Stanhope |
| 10,820,472 | B2 | 11/2020 | Stahope et al. |
| 10,820,476 | B2 | 11/2020 | Stoller et al. |
| 11,058,045 | B2 | 7/2021 | Harmon |
| 11,259,455 | B2 | 3/2022 | Johnson et al. |
| 11,266,056 | B2 | 3/2022 | Nair et al. |
| 11,277,956 | B2 | 3/2022 | Bertucci et al. |
| 2016/0134844 | A1* | 5/2016 | Casper ............... H04N 7/181 348/135 |
| 2019/0124819 | A1 | 5/2019 | Madsen et al. |
| 2020/0344939 | A1* | 11/2020 | Sporrer ............... A01B 33/16 |
| 2020/0352081 | A1 | 11/2020 | Arnett et al. |
| 2020/0352088 | A1 | 11/2020 | Arnett et al. |
| 2021/0007266 | A1 | 1/2021 | Stoller et al. |
| 2021/0080586 | A1 | 3/2021 | Dasika et al. |
| 2021/0084803 | A1 | 3/2021 | Harmon et al. |
| 2021/0084820 | A1 | 3/2021 | Vandike et al. |
| 2021/0153420 | A1 | 5/2021 | Smith |
| 2021/0176912 | A1 | 6/2021 | Harmon |
| 2021/0212249 | A1 | 7/2021 | Disberger et al. |
| 2021/0259148 | A1 | 8/2021 | Schmidt |
| 2021/0267115 | A1 | 9/2021 | Fjelstad et al. |
| 2022/0117153 | A1 | 4/2022 | Nielsen |

FOREIGN PATENT DOCUMENTS

| | | |
|---|---|---|
| DE | 10351861 A1 | 6/2005 |
| DE | 102017130694 A1 | 6/2019 |
| DE | 102018200411 A1 | 7/2019 |
| DE | 102018213212 A1 | 2/2020 |
| EP | 2936957 A1 | 10/2015 |
| EP | 2545761 B1 | 12/2016 |
| EP | 3189719 A1 | 7/2017 |
| EP | 3167698 B1 | 4/2020 |
| EP | 3732941 A1 | 11/2020 |
| EP | 3981232 A1 | 4/2022 |
| WO | WO 2020/217106 A1 | 10/2020 |
| WO | WO 2020/231934 | 11/2020 |

OTHER PUBLICATIONS

Screen Captures from YouTube Video Clip. "3D sensor on a tractor—on the way to agriculture 4.0" Uploaded on Oct. 27, 2015, by user "ifm group of companies" (6 pages) Retrieved from Internet: https://www.youtube.com/watch?v=9JIr_7HSpvQ.

Screen Captures from YouTube Video Clip. "Vertical Tillage—Viking" Uploaded on Aug. 9, 2016, by user "Versatile" (6 pages) Retrieved from Internet: https://www.youtube.com/watch?v=hSyQEdyzwtU.

"Grain Harvesting" Combines and Front End Equipment John Deere (44 pages) https://www.deere.com/assets/pdfs/region-1/products/combines/2018_S700-Series_Combine.pdf.

Dan Crummett "Variable Intensity Tillage Offers Solutions for Varying Soil Conditions" Niche Equipment Markets Manufacturer News Mar. 18, 2019 (11 pages) https://www.farm-equipment.com/articles/16770-variable-intensity-tillage-offers-solutions-for-varying-soil-conditions.

Jessie Scott "Dynamically Adjustable Tillage System From Gates Manufacturing" Jun. 16, 2015 (3 pages) https://www.agriculture.com/machinery/precision-agriculture/dynamically-adjustable-tillage-system_234-ar49223.

"VT Flex™ 435 Vertical Tillage Tool" Specifications Case IH (4 pages) https://assets.cnhindustrial.com/caseih/NAFTA/NAFTAASSETS/Products/Tillage/Vertical-Tillage/Brochures/VT-FLEX_435_Spec_Sheet_10-21_CIH21100801_pages.pdf.

J.M. Guerrero, et al., "Automatic expert system based on images for accuracy crop row detection in maize fields" Expert Systems with Application 40 (2013) 656-665 Elsevier Ltd. (9 pages) https://oa.upm.es/32345/1/INVE_MEM_2013_177714.pdf.

Björn Åstrand, et al. "An Agricultural Mobile Robot with Vision-Based Perception for Mechanical Weed Control" Autonomous Robots 13, 21-35, 2002 2002 Kluwer Academic Publishers (15 pages) https://sci-hub.hkvisa.net/10.1023/a:1015674004201.

* cited by examiner

SYSTEM AND METHOD FOR CONTROLLING THE OPERATION OF AN AGRICULTURAL IMPLEMENT

FIELD OF THE INVENTION

The present disclosure generally relates to agricultural implements and, more particularly, to systems and methods for controlling the operation of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. In general, tillage implements include ground-engaging tools, such as shanks, disks, and/or the like, supported on its frame. Each ground-engaging tool, in turn, is configured to be moved relative to the soil within the field as the tillage implement travels across the field. Such movement of the ground-engaging tools loosens and/or otherwise agitates the soil to prepare the field for subsequent planting operations.

Upon completion of the tillage operation, it is generally desirable that the residue pieces remaining on the field surface be of a given length to maintain the productivity potential of the soil. In this respect, systems for controlling the operation of an agricultural implement such that the residue pieces remaining on the field surface are of the given length have been developed. While such systems work well, further improvements are needed.

Accordingly, an improved system and method for controlling the operation of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement including a frame and a ground-engaging tool supported on the frame, with the ground-engaging tool configured to perform an operation on a field as the agricultural implement travels across the field. The agricultural implement includes an imaging device configured to generate image data depicting a portion of the field and a computing system communicatively coupled to the imaging device. In this respect, the computing system configured to identify a plurality of residue pieces present within the portion of the field based on the image data generated by the imaging device. Furthermore, the computing system is configured to determine a number of residue pieces of the identified plurality of residue pieces having a length within a first length range. Additionally, the computing system is configured to determine a number of residue pieces of the identified plurality of residue pieces having a length within a second length range, with the second length range being different from the first length range. Moreover, the computing system is configured to determine a characteristic length range for the portion of the field, with the characteristic length range corresponding to one of the first length range or the second length range having the greatest number of residue pieces associated therewith. In addition, the computing system is configured to control an operating parameter of the ground-engaging tool based on the determined characteristic length range.

In another aspect, the present subject matter is directed to a system for controlling an operation of an agricultural implement. The system includes a ground-engaging tool configured to perform an operation on a field as the agricultural implement travels across the field. The system includes an imaging device configured to generate image data depicting a portion of the field and a computing system communicatively coupled to the imaging device. In this respect, the computing system configured to identify a plurality of residue pieces present within the portion of the field based on the image data generated by the imaging device. Furthermore, the computing system is configured to determine a number of residue pieces of the identified plurality of residue pieces having a length within a first length range. Additionally, the computing system is configured to determine a number of residue pieces of the identified plurality of residue pieces having a length within a second length range, with the second length range being different from the first length range. Moreover, the computing system is configured to determine a characteristic length range for the portion of the field, with the characteristic length range corresponding to one of the first length range or the second length range having the greatest number of residue pieces associated therewith. In addition, the computing system is configured to control an operating parameter of the ground-engaging tool based on the determined characteristic length range.

In a further aspect, the present subject matter is directed to a method for controlling an operation of an agricultural implement. The agricultural implement, in turn, includes a ground-engaging tool configured to perform an operation on a field as the agricultural implement travels across the field. The method includes receiving, with a computing system, image data depicting a portion of the field. Furthermore, the method includes identifying, with the computing system, a plurality of residue pieces present within the portion of the field based on the received image data. Additionally, the method includes determining, with the computing system, a number of residue pieces of the identified plurality of residue pieces having a length within a first length range. Moreover, the method includes determining, with the computing system, a number of residue pieces of the identified plurality of residue pieces having a length within a second length range, with the second length range being different from the first length range. In addition, the method includes determining, with the computing system, a characteristic length range for the portion of the field, with the characteristic length range corresponding to one of the first length range or the second length range having the greatest number of residue pieces associated therewith. Furthermore, the method includes controlling, with the computing system, an operating parameter of the ground-engaging tool based on the determined characteristic length range.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
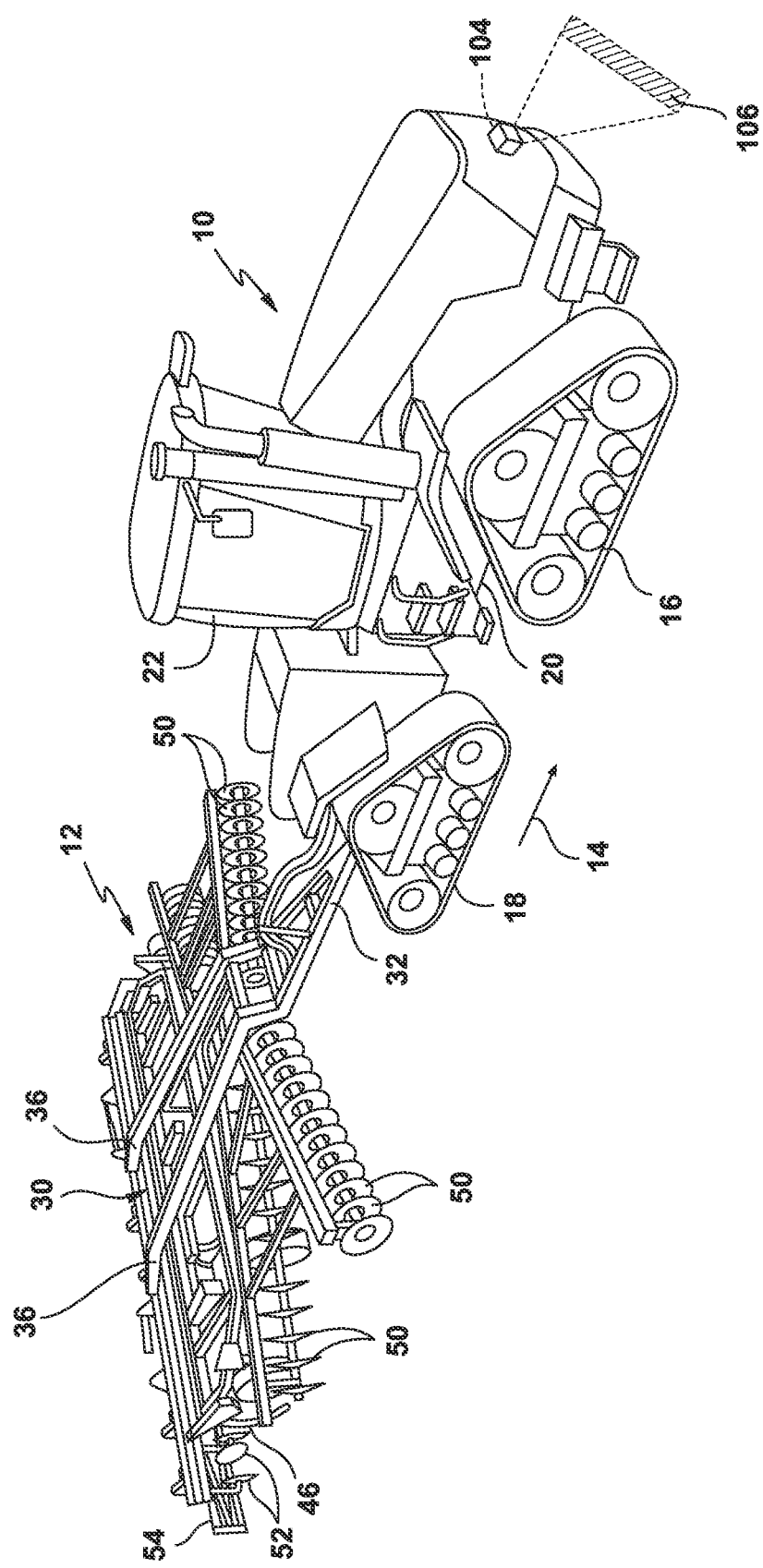
FIG. 1 illustrates a perspective view of one embodiment of a work vehicle towing an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for controlling the operation of an agricultural implement. Specifically, in several embodiments, a computing system of the disclosed system is configured to receive image data depicting a portion of the field across which the agricultural implement is traveling (e.g., to perform an agricultural operation thereon). Furthermore, the computing system is configured to identify a plurality of residue pieces present within the portion of the field based on the received image data. In addition, the computing system is configured to determine the number of identified residue pieces having a length within a first length range and the number of identified residue pieces having a length within a different, second length range. Moreover, the computing system is configured to determine a characteristic length range for the imaged portion of the field. The characteristic length range, in turn, corresponds to the first length range or the second length range having the greatest number of residue pieces associated therewith.

Additionally, in several embodiments, the computing system is configured to control one or more operating parameter(s) of a ground-engaging tool(s) of the agricultural implement based on the determined characteristic length range. Such operating parameter(s) may include the position(s) of the ground-engaging tool(s) relative to the implement frame, the penetration depth(s) of the ground-engaging tool(s), and/or the force(s) being applied to the ground-engaging tool(s). For example, in some embodiments, the computing system may control an angle(s) of a disk gang(s) of the agricultural implement relative to the frame based on the determined characteristic length range. Specifically, in such an embodiment, the computing system may initiate an increase in the angle(s) of the disk gang(s) relative to the frame when the characteristic length range changes from a first or smaller length range to a second or larger length range. Conversely, in such an embodiment, the computing system may initiate a decrease in the angle(s) of the disk gang(s) relative to the frame when the characteristic length range changes from the second or larger length range to the first or smaller length range.

Controlling an operating parameter(s) of the ground-engaging tool(s) of the agricultural implement based on the characteristic length range for the residue pieces present within the field improves the operation of the agricultural implement. More specifically, to leave residue pieces on the field surface having a given length after completion of an agricultural operation (e.g., a tillage operation), it is generally necessary to adjust the operating parameter(s) of the agricultural implement based on the lengths of the residue pieces present within the field prior to the operation. Because there can be a variety of lengths of residue pieces present on a portion of the field, some conventional systems use the average length of residue pieces or the range of lengths to control the implement operating parameter(s). However, in many instances, the lengths of the residue pieces may be skewed toward one end of the range. For example, a portion of the field may have many long residue pieces, with a few short pieces. Alternatively, the portion of the field may have many short residue pieces, with a few long pieces. In this respect, the average length and the length range of the residue pieces for a portion of the field may not provide an accurate indication of the typical lengths of the residue pieces present within that portion of the field. As described above, the characteristic length range corresponds to the particular residue piece length range having the greatest number of residue pieces associated therewith. Thus, by controlling the operating parameter(s) of the ground-engaging tool(s) based on the particular residue piece length range having the greatest number of residue pieces associated therewith, the operation of the agricultural implement can be tailored to the residue length range most prevalent within the field. This, in turn, results in the lengths of residue pieces remaining on the field surface upon completion of the agricultural operation more closely corresponding to the given length.

Figure 2:
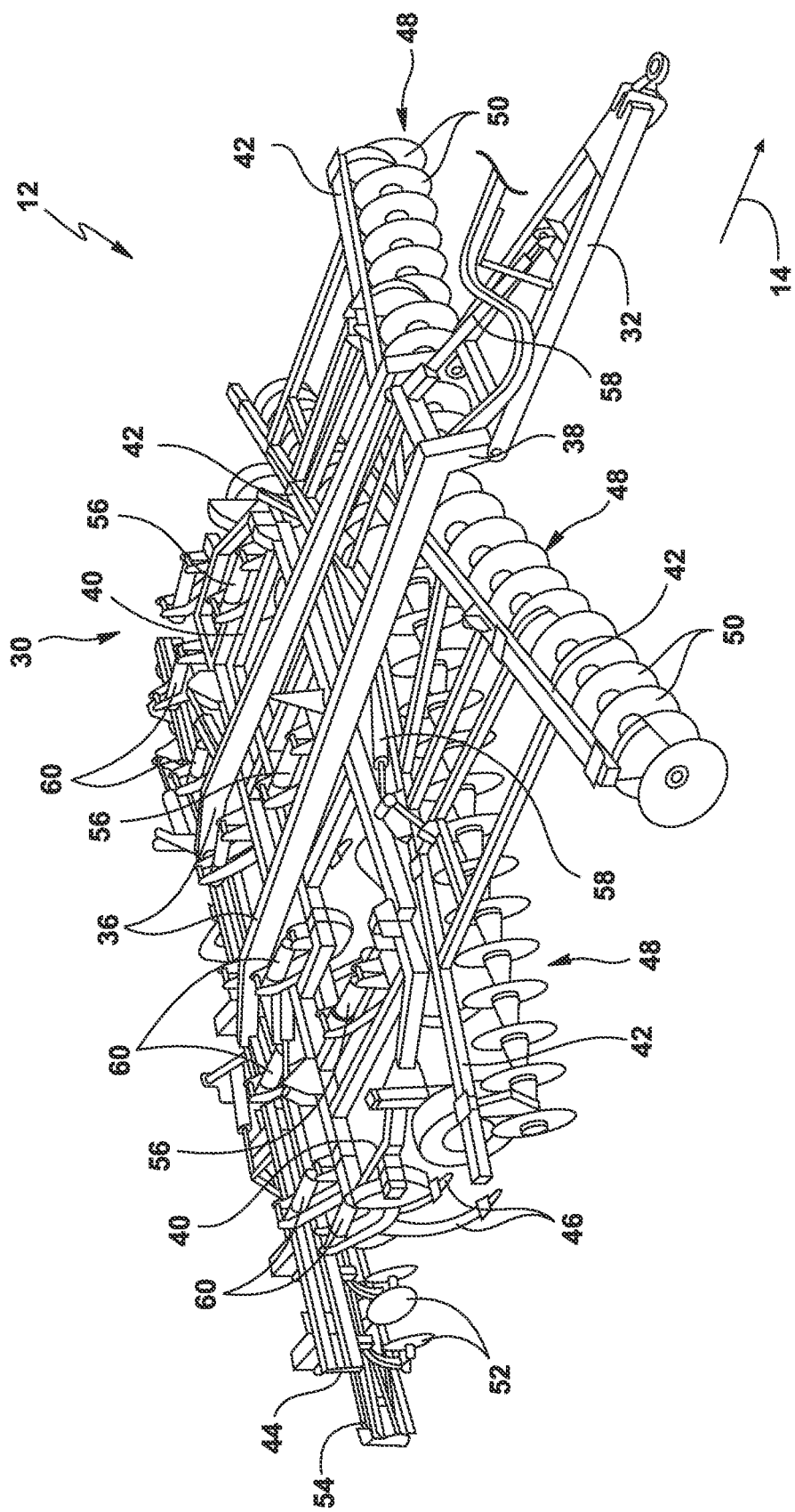
FIG. 2 illustrates a perspective view of the agricultural implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the agricultural implement 12 across a field in a travel direction (e.g., as indicated by arrow 14). Additionally, FIG. 2 illustrates a perspective view of the agricultural implement 12 shown in FIG. 1.

As shown in the illustrated embodiment, the work vehicle 10 is configured as an agricultural tractor and the agricultural implement 12 is configured as a tillage implement. However, in other embodiments, the work vehicle 10 may be configured as any other suitable agricultural or other type of work vehicle. Similarly, in other embodiments, the agricultural implement 12 may be configured as any other suitable agricultural implement configured to be towed by a work vehicle.

As particularly shown in FIG. 1, the work vehicle 10 includes a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 10 and/or one or more components of the implement 12.

Additionally, as shown in FIGS. 1 and 2, the implement 12 may generally include a carriage frame assembly 30 configured to be towed by the work vehicle 10 via a pull hitch or tow bar 32 in the travel direction 14 of the vehicle/implement 10/12. In general, the carriage frame assembly 30 may support a plurality of ground-engaging tools, such as a plurality of shanks, disk blades, leveling blades, basket assemblies, tines, spikes, and/or the like. In several embodiments, the various ground-engaging tools may be configured to perform a tillage operation or any other suitable ground-engaging operation across the field along which the implement 12 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally support a central frame 40, a forward frame 42 positioned forward of the central frame 40 relative to the travel direction 14 of the vehicle/implement 10/12, and an aft frame 44 positioned aft of the central frame 40 relative to the travel direction 14 of the vehicle/implement 10/12. As shown, in one embodiment, the central frame 40 may correspond to a shank frame configured to support a plurality of ground-engaging shanks 46. In such an embodiment, the shanks 46 may be configured to till or otherwise engage the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disks 50. Specifically, the disks 50 are spaced apart from each other along the length of the disk gang 48 and configured to rotate relative to the soil within the field as the agricultural implement 12 travels across the field in the travel direction 14. Furthermore, each disk 50 may include both a concave side (not shown) and a convex side (not shown). In addition, the various gangs 48 of disks 50 may be oriented at an angle relative to the travel direction 14 of the vehicle/implement 10/12 to promote more effective tilling of the soil. However, in other embodiments, the forward frame 42 may be configured to support any other suitable ground-engaging tools.

Moreover, like the central and forward frames 40, 42, the aft frame 44 may also be configured to support a plurality of ground-engaging tools. For instance, in the illustrated embodiment, the aft frame 44 is configured to support a plurality of leveling blades 52 and rolling (or crumbler) basket assemblies 54. However, in other embodiments, any other suitable ground-engaging tools may be coupled to and supported by the aft frame 44, such as a plurality of closing disks.

In addition, the implement 12 may also include any number of suitable ground-engaging tool actuators (e.g., hydraulic cylinders) for adjusting the relative positioning of, the penetration depth of, and/or the force being applied to the various ground-engaging tools 46, 50, 52, 54. For instance, the implement 12 may include one or more actuators 56 coupled to the central frame 40 for raising and/or lowering the central frame 40 relative to the ground, thereby allowing the penetration depth of and/or the force being applied to the shanks 46 to be adjusted. Similarly, the implement 12 may include one or more actuators 58 coupled to the forward frame 42 to adjust the penetration depth of and/or the force being applied to the disk blades 50. Moreover, the implement 12 may include one or more actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the force being applied to and/or the penetration depth of) to be adjusted.

The configuration of the work vehicle 10 described above and shown in FIG. 1 is provided only to place the present subject matter in an exemplary field of use. Thus, the present subject matter may be readily adaptable to any manner of work vehicle configuration.

Additionally, the configuration of the agricultural implement 12 described above and shown in FIGS. 1 and 2 is only provided for exemplary purposes. Thus, the present subject matter may be readily adaptable to any manner of implement configuration. For example, the agricultural implement 12 may be configured as a planting implement, a fertilizing implement, and/or any other suitable type of agricultural implement.

Referring particularly to FIG. 1, the work vehicle 10 and/or the agricultural implement 12 may include one or more imaging devices 104 coupled thereto and/or supported thereon. More specifically, the imaging device(s) 104 is configured to generate image data depicting a portion of the field present within its field of view 106 as the vehicle/implement 10/12 moves across the field in the travel direction 14. As will be described below, the image data generated by the imaging device(s) 104 is analyzed to identify the lengths of the residue pieces depicted therein. Such length data is subsequently used in controlling one or more operation parameters of the ground-engaging tools of the of the agricultural implement 12.

In general, the imaging device(s) 104 may correspond to any suitable sensing devices configured to generate image data or image-like data depicting the surface profile of the field. Specifically, in several embodiments, the imaging device(s) 104 may correspond to a suitable camera(s) configured to capture images of the soil surface of the field present within the field of view 106, thereby allowing the lengths of the residue pieces present on the surface of the field to be determined by analyzing the content of each image. For instance, in a particular embodiment, each imaging device(s) 104 may correspond to a stereographic camera(s) having two or more lenses with a separate image sensor for each lens to allow the cameras to capture stereographic or three-dimensional images. Alternatively, the imaging device(s) 104 may correspond to any other suitable devices for generating image data or image-like data, such as a monocular camera(s), a LiDAR device(s), a RADAR device(s), and/or the like.

The imaging device(s) 104 may be mounted at any suitable location(s) on the work vehicle 10 and/or the agricultural implement 12 that allows the imaging device(s) 104 to generate image data depicting a portion(s) of the field forward of the ground-engaging tools 46, 50, 52 of the implement 12. For example, in the illustrated embodiment, an imaging device 104 is mounted on the forward end of the work vehicle 10. However, in alternative embodiments, an imaging device(s) 104 may be mounted at any other suitable location(s), such as at the forward end of the carriage frame assembly 30 or the forward frame 42 of the agricultural implement 12.

Additionally, in the illustrated embodiment, a single imaging device 104 is in operative association with the work vehicle 10. However, in alternative embodiments, multiple imaging devices 104 may be in operative association with the work vehicle 10 and/or the agricultural implement 12.

Figure 3:
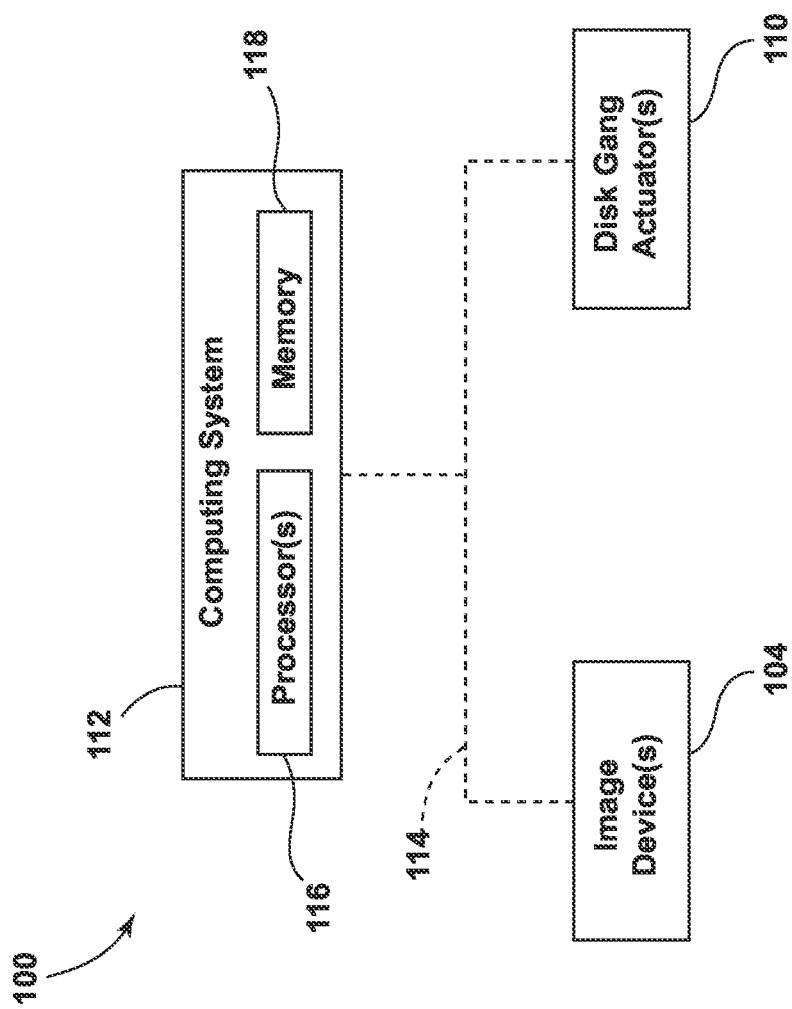
FIG. 3 illustrates a schematic view of one embodiment of a system for controlling an operation of an agricultural implement in accordance with aspects of the present subject matter.

Referring now to FIG. 3, a schematic view of one embodiment of a system 100 for controlling the operation of an agricultural implement is illustrated in accordance with aspects of the present subject matter. In general, the system 100 will be described herein with reference to the work vehicle 10 and the agricultural implement 12 described above with reference to FIGS. 1 and 2. However, it should be appreciated by those of ordinary skill in the art that the disclosed system 100 may generally be utilized with work vehicles having any other suitable vehicle configuration and/or agricultural implements having any other suitable implement configuration.

As shown in FIG. 3, the system 100 includes one or more disk gang actuator(s) 110 of the agricultural implement 12. In general, each disk gang actuator 110 is configured to adjust the angle or orientation of one of the disk gangs 48 of the implement 12 relative to the carriage frame 30 of the implement 12. Adjusting the angle(s) of the disk gang(s) 48 relative to the carriage frame 30, in turn, adjusts the lengths of the residue pieces remaining on surface of the field upon completion of the agricultural operation. The disk gang actuator(s) 110 may correspond to any suitable device(s) for adjusting the angle(s) of the disk gang(s) 48, such as a hydraulic cylinder(s), a pneumatic cylinder(s), an electric linear actuator(s), and/or the like. Additionally, the system 100 may include any other suitable components of the work vehicle 10 and/or the agricultural implement 12.

Moreover, the system 100 includes a computing system 112 communicatively coupled to one or more components of the work vehicle 10, the agricultural implement 12, and/or the system 100 to allow the operation of such components to be electronically or automatically controlled by the computing system 112. For instance, the computing system 112 may be communicatively coupled to the imaging device(s) 104 via a communicative link 114. As such, the computing system 112 may be configured to receive image data from the imaging device(s) 104 that is indicative of the residue present within the field across which the vehicle/implement 10/12 is traveling. Furthermore, the computing system 112 may be communicatively coupled to the disk gang actuator(s) 110 via the communicative link 114. In this respect, the computing system 112 may be configured to control the operation of the disk gang actuator(s) 110 to adjust the angle of the disk gang(s) 48 relative to the carriage frame 30. In addition, the computing system 112 may be communicatively coupled to any other suitable components of the work vehicle 10, the agricultural implement 12, and/or the system 100. For example, the computing system 112 may be communicatively coupled to the actuators 56, 58, 60 of the agricultural implement 12 via the communicative link 114.

In general, the computing system 112 may comprise one or more processor-based devices, such as a given controller or computing device or any suitable combination of controllers or computing devices. Thus, in several embodiments, the computing system 112 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 118 of the computing system 112 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 118 may generally be configured to store suitable computer-readable instructions that, when implemented by the processor(s) 116, configure the computing system 112 to perform various computer-implemented functions, such as one or more aspects of the methods and algorithms that will be described herein. In addition, the computing system 112 may also include various other suitable components, such as a communications circuit or module, one or more input/output channels, a data/control bus and/or the like.

The various functions of the computing system 112 may be performed by a single processor-based device or may be distributed across any number of processor-based devices, in which instance such devices may be considered to form part of the computing system 112. For instance, the functions of the computing system 112 may be distributed across multiple application-specific controllers or computing devices, such as a navigation controller, an engine controller, a transmission controller, an implement controller, and/or the like.

Figure 4:
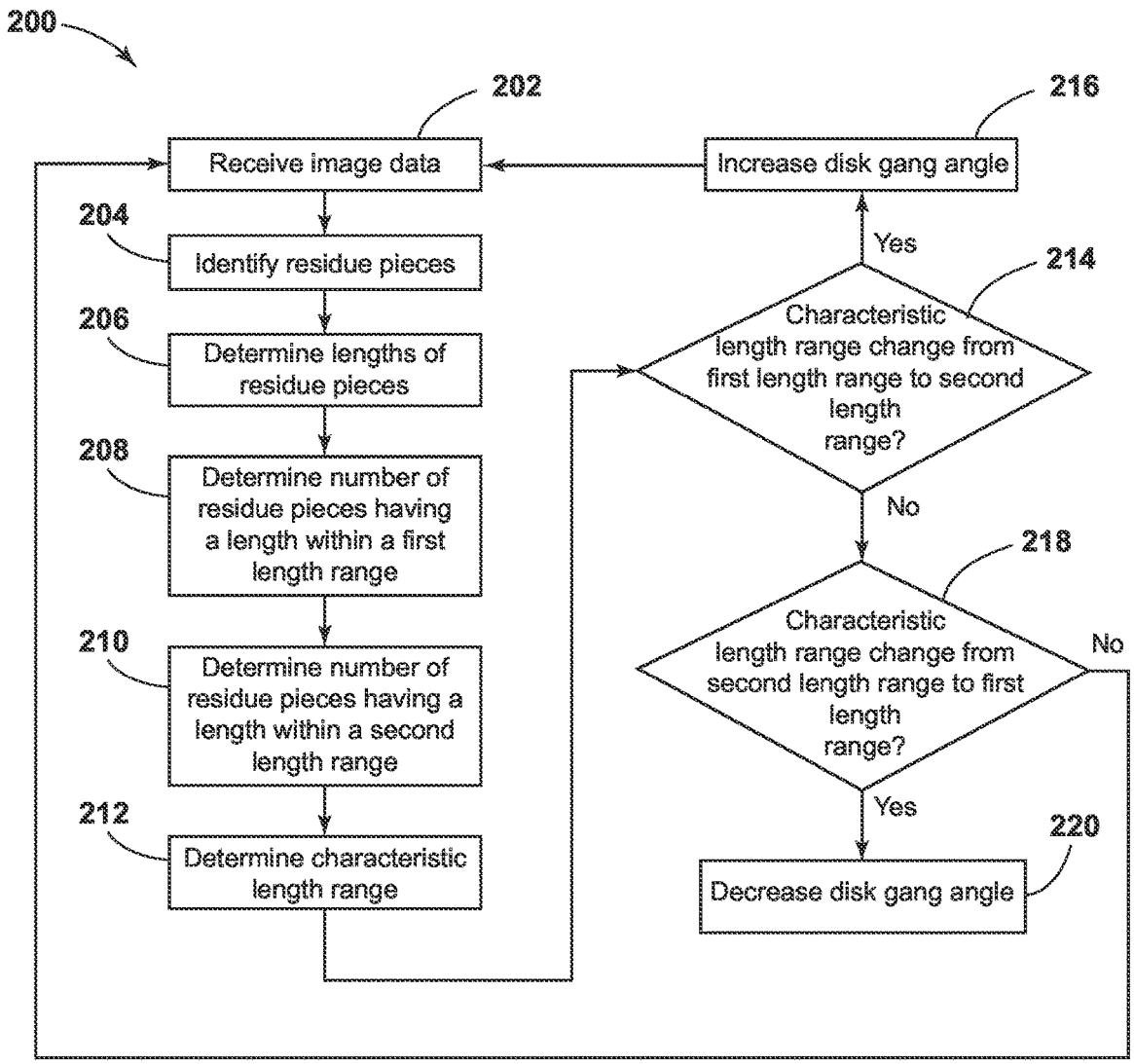
FIG. 4 illustrates a flow diagram providing one embodiment of control logic for controlling an operation of an agricultural implement in accordance with aspects of the present subject matter.

Referring now to FIG. 4, a flow diagram of one embodiment of control logic 200 that may be executed by the computing system 112 (or any other suitable computing system) for controlling the operation of an agricultural implement is illustrated in accordance with aspects of the present subject matter. Specifically, the control logic 200 shown in FIG. 4 is representative of steps of one embodiment of an algorithm that can be executed to control the operation of an agricultural implement in a manner that results in the lengths of the residue pieces remaining on the field surface upon completion of the agricultural operation more closely corresponding to a selected or given length. Thus, in several embodiments, the control logic 200 may be advantageously utilized in association with a system installed on or forming part of a work vehicle and/or an agricultural implement to allow for real-time control of the agricultural implement without requiring substantial computing resources and/or processing time. However, in other embodiments, the control logic 200 may be used in association with any other suitable system, application, and/or the like for controlling the operation of an agricultural implement.

As shown, at (202), the control logic 200 includes receiving image data depicting a portion of a field across which an agricultural implement is traveling. Specifically, as mentioned above, in several embodiments, the computing system 112 is communicatively coupled to the imaging device(s) 104 via the communicative link 114. In this respect, as the agricultural implement 12 travels across the field to perform an agricultural operation (e.g., a tillage operation) thereon, the computing system 112 may receive image data from the imaging device(s) 104. Such image data, in turn, depicts the residue pieces present on the surface of a portion of the field.

Furthermore, at (204), the control logic 200 includes identifying, with the computing system, a plurality of residue pieces present within the portion of the field based on the received image data. Specifically, in several embodiments, the computing system 112 is configured to analyze the image data received at (202) to identify a plurality of residue pieces present within the portion of the field depicted in the received image data. For example, the computing system 112 may use any suitable image processing algorithms or techniques to identify the residue pieces, such as color-based image processing algorithms, texture-based image processing algorithms, and/or the like.

Additionally, at (206), the control logic 200 includes determining the lengths of the identified plurality of residue pieces. Specifically, in several embodiments, the computing system 112 is configured to analyze each of the plurality of residue pieces identified at (204) to determine its length. As used herein, the length of a residue piece corresponds to its longest dimension.

Moreover, at (208), the control logic 200 includes determining, with the computing system, the number of identified residue pieces having a length within a first length range. Specifically, in several embodiments, the computing system 112 is configured to analyze the lengths of the residue pieces determined at (206) to determine the number of identified residue pieces having a length within a first length range.

In addition, at (210), the control logic 200 includes determining the number of identified residue pieces having a length within a second length range. Specifically, in several embodiments, the computing system 112 is configured to analyze the lengths of the residue pieces determined at (206) to determine the number of identified residue pieces having a length within a second length range. In general, the second length range is different from the first length range. For example, the first length range may correspond to a small length range and the second length range may correspond to a large length range. In one embodiment, the first and second length ranges do not overlap.

The control logic 200 is described herein in the context of two length ranges. However, in alternative embodiments, the lengths determined at (206) may be placed into any suitable number of length ranges, such as three length ranges (e.g., small, medium, and large length ranges) or four or more length ranges.

Furthermore, at (212), the control logic 200 includes determining a characteristic length range for the portion of the field. The characteristic length range, in turn, corresponds to the first or second length range having the greatest number of residue pieces associated therewith. As such, the computing system 112 is configured to determine a characteristic length range for the portion of the field based on the number of residue pieces having lengths within the first length range and the number of residue pieces having lengths within the second length range. Specifically, the computing system 112 determines which of the first and second length ranges has the most residue pieces with lengths falling therein and assigns that length range as the characteristic length range. For example, when more residue pieces have lengths falling within the first length range than the second length range, the computing system 112 determines that the first length range is characteristic length range. Conversely, when more residue pieces have lengths falling within the second length range than the first length range, the computing system 112 determines that the second length range is characteristic length range.

Figure 5:
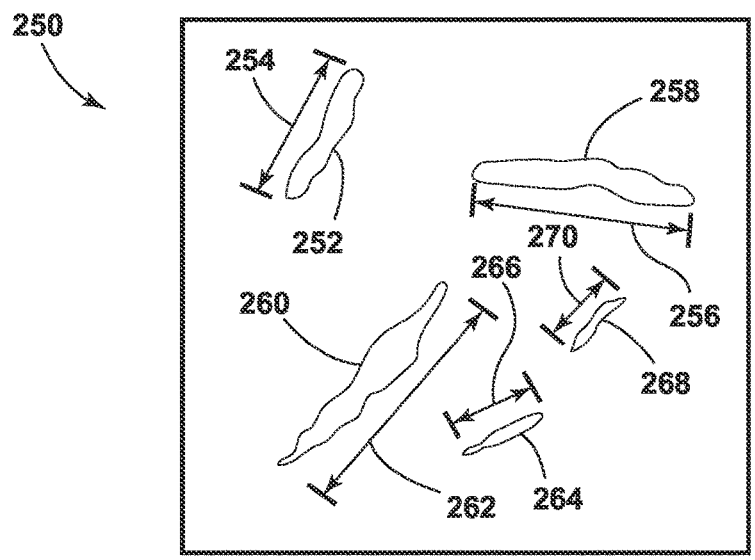
FIG. 5 illustrates an example view of an imaged portion of a field in accordance with aspects of the present subject matter, particularly illustrating a plurality of residues having lengths falling within different length ranges.

FIG. 5 illustrates an example view of an imaged portion of a field 250. As shown, the imaged portion of the field 250 includes a first residue piece 252 having a first length 254, a second residue piece 256 having a second length 258, a third residue piece 260 having a third length 262, a fourth residue piece 264 having a fourth length 266, and a fifth residue piece 268 having a fifth length 270. Assuming that the first, second, and third lengths 254, 258, 262 fall within the second length range (e.g., a large length range) and the fourth and fifth lengths 266, 270 fall within the first length range (e.g., a small length range), the characteristic length range for the imaged portion of the field 250 would be the second length range.

As will be described below, one or more operating parameters of the ground-engaging tool(s) of the agricultural implement 12 are controlled based on the characteristic length range determined at (212). Such operating parameter(s), in turn, may include the positioning of the ground-engaging tool(s) relative to the implement frame, the penetration depth(s) of the ground-engaging tool(s), and/or the force(s) being applied to the ground-engaging tool(s) of the agricultural implement 12. Moreover, the operating parameter(s) of any suitable ground-engaging tool(s) of the agricultural implement 12 may be controlled based on the characteristic length range determined at (212). In one embodiment, the computing system 112 may control the operation of the actuators 56 to adjust the relative positioning of, the penetration depth of, and/or the force being applied to the disks 42 of the agricultural implement 12. In another embodiment, the computing system 112 may control the operation of the actuators 60 to adjust the relative positioning of, the penetration depth of, and/or the force being applied to the leveling blades 52 of the agricultural implement 12. In further embodiments, the computing system 112 may control the operation of the actuators 58 and/or the disk gang actuator(s) 110 to adjust the relative positioning of, the penetration depth of, and/or the force being applied to the disk gangs 48 of the agricultural implement 12.

Figure 6:
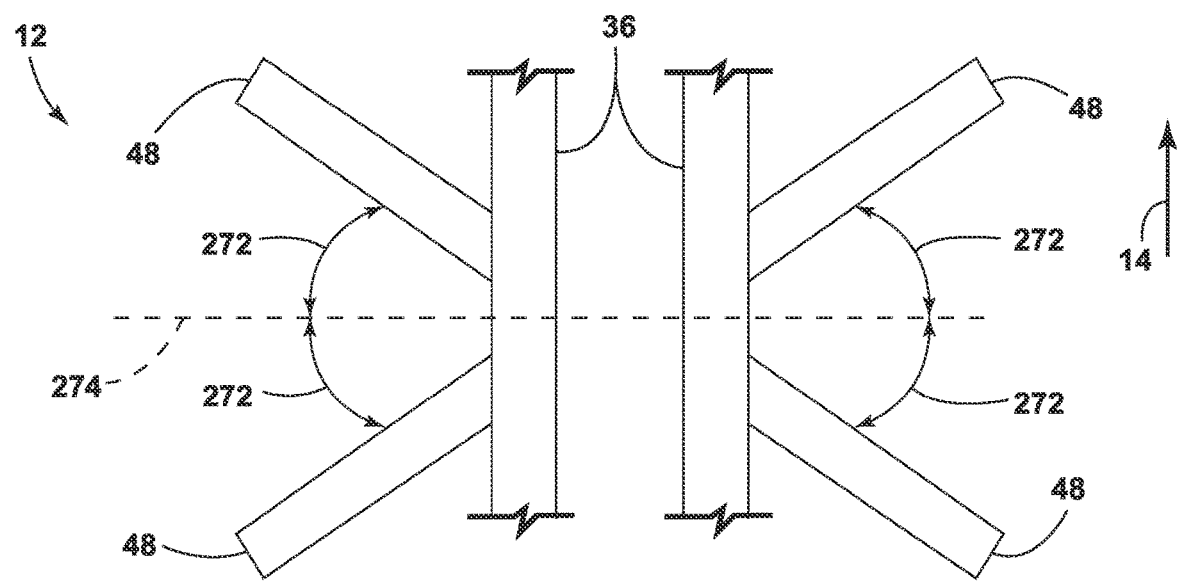
FIG. 6 illustrates a diagrammatic top view of an agricultural implement in accordance with aspects of the present subject matter, particularly illustrating a disk gang angle of the agricultural implement.

For example, as will be described below, in a particular embodiment, the computing system 112 may control the operation of the disk gang actuator(s) 110 to adjust the angle(s) of the disk gang(s) 48 relative to the carriage frame 30. FIG. 6 illustrates the disk gang angles of the agricultural implement 12 as used herein. As shown, disk gang angles 272 are defined between the disk gangs 48 and a lateral centerline 274 of the agricultural implement 12, with the lateral centerline 274 extending perpendicular to the travel direction 14.

Referring again to FIG. 4, at (214), the control logic 200 includes determining when the characteristic length range changes from the first length range to the second length range. Specifically, in several embodiments, the second length range corresponds to greater residue lengths than the first length range. In such embodiments, the computing system 112 is configured to compare the characteristic length range determined at (212) for the current portion of the field to the determined characteristic length range for the previous portion of the field. When the current characteristic length range is the second length range and the previous characteristic length range is the first length range, the control logic 200 proceeds to (216). Alternatively, when the current characteristic length range is the first length range and the previous characteristic range is the second length range or the current and previous characteristic length ranges are the same, the control logic 200 proceeds to (218).

Additionally, at (216), the control logic 200 includes initiating an increase in the angle of a disk gang of the agricultural implement relative to a frame of the agricultural implement. More specifically, when the current characteristic length range is the second length range and the previous characteristic range is the first length range, the typical length range of the reside pieces present within the field has increased. As such, it is necessary to increase the disk gang angles (e.g., the disk gang angles 272 in FIG. 6) to reduce the size of the residue pieces and incorporate more residue into the soil. In this respect, the computing system 112 may be configured to transmit control signals to the disk gang actuator(s) 110 via the communicative link 114. Such control signals, in turn, instruct the disk gang actuator(s) 110 to move the disk gang(s) 48 relative to the carriage frame 30 to increase the disk gang angle(s). Upon completion of (216), the control logic 200 returns to (202).

Conversely, at (218), the control logic 200 includes determining when the characteristic length range changes from the second length range to the first length range. As mentioned above, in several embodiments, the second length range corresponds to greater residue lengths than the first length range. In such embodiments, the computing system 112 is configured to compare the characteristic length range determined at (212) for the current portion of the field to the determined characteristic length range for the previous portion of the field. When the current characteristic length range is the first length range and the previous characteristic length range is the second length range, the control logic 200 proceeds to (220). Alternatively, when the current and previous characteristic length ranges are the same, the control logic 200 returns to (202).

Moreover, at (220), the control logic 200 includes initiating a decrease in the angle of the disk gang relative to the frame of the agricultural implement. More specifically, when the current characteristic length range is the first length range and the previous characteristic range is the second length range, the typical length range of the residue pieces present within the field has decreased. As such, it is necessary to decrease the disk gang angles (e.g., the disk gang angles 272 in FIG. 6) to incorporate less residue into the soil. In this respect, the computing system 112 may be configured to transmit control signals to the disk gang actuator(s) 110 via the communicative link 114. Such control signals, in turn, instruct the disk gang actuator(s) 110 to move the disk gang(s) 48 relative to the carriage frame 30 to decrease the disk gang angle(s). Upon completion of (220), the control logic 200 returns to (202).

For example, in one embodiment, the lengths of each identified residue piece may be placed within one of a small length range, a medium length range, or a large length range. In this respect, when the characteristic length range for the current portion of the field corresponds to the small length range, the disk gang angle may be about zero degrees. Moreover, when the characteristic length range for the current portion of the field corresponds to the medium length range, the disk gang angle may be about nine degrees. In addition, when the characteristic length range for the current portion of the field corresponds to the large length range, the disk gang angle may be eighteen degrees. However, in alternative embodiments, the disk gang angles corresponding to each residue piece length range may be different.

Figure 7:
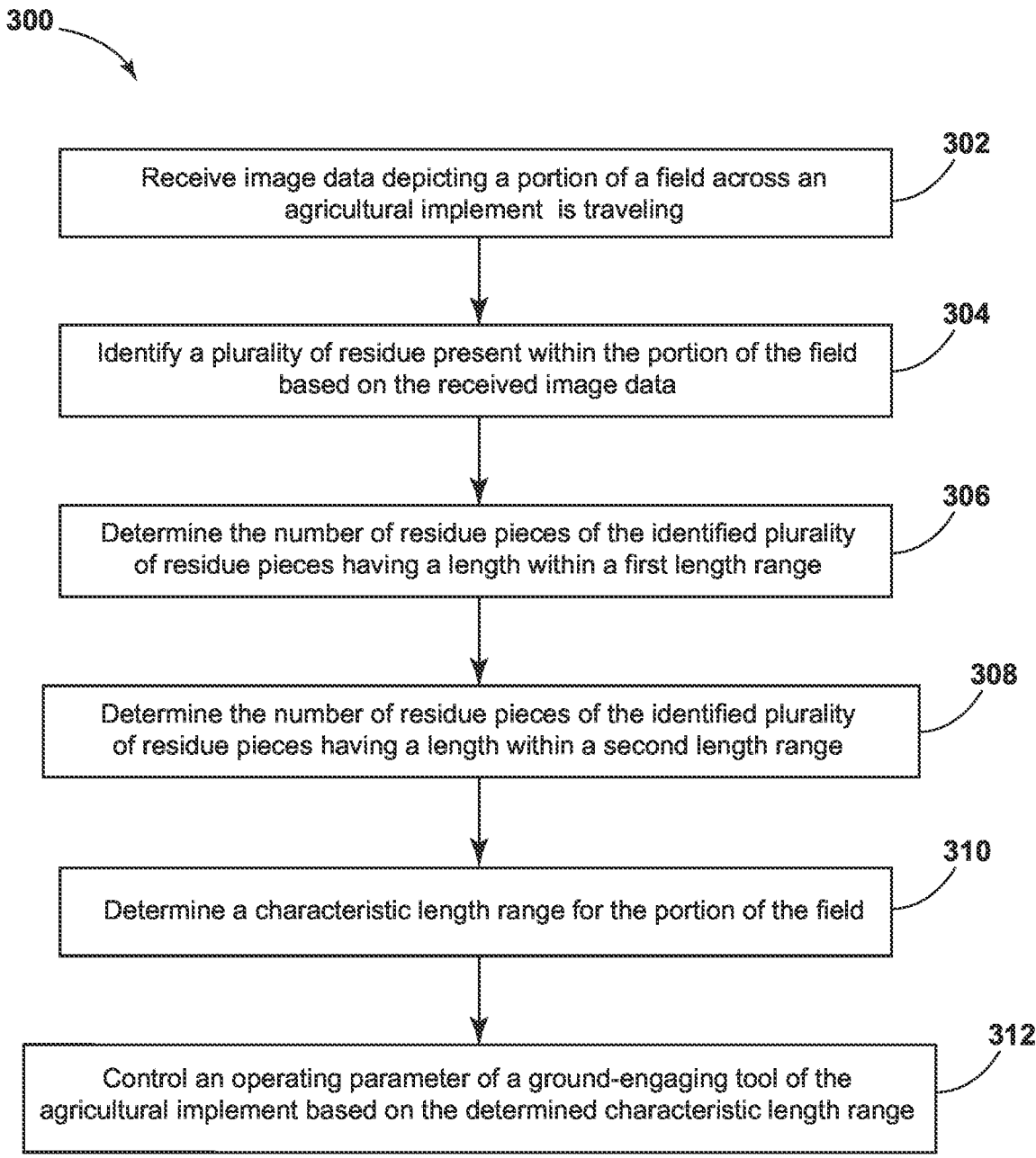
FIG. 7 illustrates a flow diagram of one embodiment of a method for controlling an operation of an agricultural implement in accordance with aspects of the present subject matter.

Referring now to FIG. 7, a flow diagram of one embodiment of a method 300 for controlling the operation of an agricultural implement is illustrated in accordance with aspects of the present subject matter. In general, the method 300 will be described herein with reference to the work vehicle 10, the agricultural implement 12, and the system 100 described above with reference to FIGS. 1-6. However, it should be appreciated by those of ordinary skill in the art that the disclosed method 300 may generally be implemented with any work vehicle having any suitable vehicle configuration, any agricultural implement having any suitable implement configuration, and/or within any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 includes receiving, with a computing system, image data depicting a portion of a field across which an agricultural implement is traveling. For instance, as described above, the computing system 112 may receive image data from the imaging device(s) 104 via the communicative link 114. Such image data, in turn, depicts a portion of a field across which the vehicle/implement 10/12 is traveling.

Furthermore, at (304), the method 300 includes identifying, with the computing system, a plurality of residue pieces present within the portion of the field based on the received image data. For instance, as described above, the computing system 112 may identify a plurality of residue pieces present within the portion of the field based on the received image data.

Additionally, at (306), the method 300 includes determining, with the computing system, the number of residue pieces of the identified plurality of residue pieces having a length within a first length range. For instance, as described above, the computing system 112 may determine the number of residue pieces of the identified plurality of residue pieces having a length within a first length range.

Moreover, at (308), the method 300 includes determining, with the computing system, the number of residue pieces of the identified plurality of residue pieces having a length within a second length range. For instance, as described above, the computing system 112 may determine the number of residue pieces of the identified plurality of residue pieces having a length within a different, second length range.

In addition, at (310), the method 300 includes determining, with the computing system, a characteristic length range for the portion of the field. For instance, as described above, the computing system 112 may determine a characteristic length range for the portion of the field. The characteristic length range, in turn, corresponds to one of the first length range or the second length range having the greatest number of residue pieces associated therewith.

Furthermore, at (312), the method 300 includes controlling, with the computing system, an operating parameter of a ground-engaging tool of the agricultural implement based on the determined characteristic length range. For instance, as described above, the computing system 112 may control one or more operating parameter(s) (e.g., the relative positioning of, the penetration depth(s) of, and/or the force(s)

being applied to) of the ground-engaging tool(s) of the agricultural implement 12 based on the determined characteristic length range. In some embodiments, the computing system 112 may control the operation of the disk gang actuator(s) 110 to adjust angle(s) of the disk gang(s) 48 of the agricultural implement 12 based on the determined characteristic length range.

It is to be understood that the steps of the control logic 200 and the method 300 are performed by the computing system 112 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 112 described herein, such as the control logic 200 and the method 300, is implemented in software code or instructions which are tangibly stored on a tangible computer readable medium. The computing system 112 loads the software code or instructions via a direct interface with the computer readable medium or via a wired and/or wireless network. Upon loading and executing such software code or instructions by the computing system 112, the computing system 112 may perform any of the functionality of the computing system 112 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
a frame;
a ground-engaging tool supported on the frame, the ground-engaging tool configured to perform an operation on a field as the agricultural implement travels across the field;
an imaging device configured to generate image data depicting a portion of the field; and
a computing system communicatively coupled to the imaging device, the computing system configured to:
identify a plurality of residue pieces present within the portion of the field based on the image data generated by the imaging device;
determine a number of residue pieces of the identified plurality of residue pieces having a length within a first length range;
determine a number of residue pieces of the identified plurality of residue pieces having a length within a second length range, the second length range being different from the first length range;
determine a characteristic length range for the portion of the field, the characteristic length range corresponding to one of the first length range or the second length range having the greatest number of residue pieces associated therewith; and
control an operating parameter of the ground-engaging tool based on the determined characteristic length range.

2. The agricultural implement of claim 1, wherein, when controlling the operating parameter, the computing system is configured to control a position of the ground-engaging tool relative to the frame.

3. The agricultural implement of claim 1, wherein, when controlling the operating parameter, the computing system is configured to control a penetration depth of the ground-engaging tool.

4. The agricultural implement of claim 1, wherein, when controlling the operating parameter, the computing system is configured to control a force being applied to the ground-engaging tool.

5. The agricultural implement of claim 1, wherein the ground-engaging tool comprises a disk gang including a plurality of disks configured to rotate relative to soil within the field as the agricultural implement travels across the field.

6. A system for controlling an operation of an agricultural implement, the system comprising:
a ground-engaging tool configured to perform an operation on a field as the agricultural implement travels across the field;
an imaging device configured to generate image data depicting a portion of the field; and
a computing system communicatively coupled to the imaging device, the computing system configured to:
identify a plurality of residue pieces present within the portion of the field based on the image data generated by the imaging device;
determine a number of residue pieces of the identified plurality of residue pieces having a length within a first length range;
determine a number of residue pieces of the identified plurality of residue pieces having a length within a second length range, the second length range being different from the first length range;
determine a characteristic length range for the portion of the field, the characteristic length range corresponding to one of the first length range or the second length range having the greatest number of residue pieces associated therewith; and
control an operating parameter of the ground-engaging tool based on the determined characteristic length range.

7. The system of claim 6, wherein, when controlling the operating parameter, the computing system is configured to control a position of the ground-engaging tool relative to a frame of the agricultural implement.

8. The system of claim 6, wherein, when controlling the operating parameter, the computing system is configured to control a penetration depth of the ground-engaging tool.

9. The system of claim 6, wherein, when controlling the operating parameter, the computing system is configured to control a force being applied to the ground-engaging tool.

10. The system of claim 6, wherein the ground-engaging tool comprises a disk gang including a plurality of disks configured to rotate relative to soil within the field as the agricultural implement travels across the field.

11. The system of claim 10, wherein, when controlling the operating parameter, the computing system is configured to control an angle of the disk gang relative to a frame of the agricultural implement.

12. The system of claim 11, wherein the second length range corresponds to greater residue lengths than the first length range.

13. The system of claim 12, wherein, when controlling the operating parameter, the computing system is configured to:
    determine when the characteristic length range changes from the first length range to the second length range; and
    initiate an increase in the angle of the disk gang relative to the frame.

14. The system of claim 12, wherein, when controlling the operating parameter, the computing system is configured to:
    determine when the characteristic length range changes from the second length range to the first length range; and
    initiate a decrease in the angle of the disk gang relative to the frame.

15. A method for controlling an operation of an agricultural implement, the agricultural implement including a ground-engaging tool configured to perform an operation on a field as the agricultural implement travels across the field, the method comprising:
    receiving, with a computing system, image data depicting a portion of the field;
    identifying, with the computing system, a plurality of residue pieces present within the portion of the field based on the received image data;
    determining, with the computing system, a number of residue pieces of the identified plurality of residue pieces having a length within a first length range;
    determining, with the computing system, a number of residue pieces of the identified plurality of residue pieces having a length within a second length range, the second length range being different from the first length range;
    determining, with the computing system, a characteristic length range for the portion of the field, the characteristic length range corresponding to one of the first length range or the second length range having the greatest number of residue pieces associated therewith; and
    controlling, with the computing system, an operating parameter of the ground-engaging tool based on the determined characteristic length range.

16. The method of claim 15, wherein controlling the operating parameter comprises controlling, with the computing system, a position of the ground-engaging tool relative to a frame of the agricultural implement.

17. The method of claim 15, wherein controlling the operating parameter comprises controlling, with the computing system, a penetration depth of the ground-engaging tool.

18. The method of claim 15, wherein controlling the operating parameter comprises controlling, with the computing system, a force being applied to the ground-engaging tool.

19. The method of claim 15, wherein the ground-engaging tool comprises a disk gang including a plurality of disks configured to rotate relative to soil within the field as the agricultural implement travels across the field.

20. The method of claim 19, wherein controlling the operating parameter comprises controlling, with the computing system, an angle of the disk gang relative to a frame of the agricultural implement.

* * * * *